Jan. 15, 1946.  H. S. TENNY  2,393,073
MEANS AND METHOD OF PRODUCING BINOCULAR PRISMS
Filed May 22, 1944  2 Sheets-Sheet 1

INVENTOR.
Henry S. Tenny
BY
A. B. Bowman
Attorney

Jan. 15, 1946. H. S. TENNY 2,393,073
MEANS AND METHOD OF PRODUCING BINOCULAR PRISMS
Filed May 22, 1944 2 Sheets-Sheet 2

INVENTOR.
Henry S. Tenny
BY
A.B.Bowman
Attorney

Patented Jan. 15, 1946

2,393,073

UNITED STATES PATENT OFFICE 2,393,073

MEANS AND METHOD OF PRODUCING BINOCULAR PRISMS

Henry S. Tenny, Encinitas, Calif.

Application May 22, 1944, Serial No. 536,701

16 Claims. (Cl. 51—216)

My invention relates to a means and method of producing binocular prisms and the objects of my invention are:

First, to provide a means and method of producing binocular prisms whereby various surfaces of the prism are both ground and polished in consecutive order without changing or shifting their supports, thus reducing to a minimum the cost of production;

Second, to provide a novel supporting means for the prism while under grinding and polishing operation in its varying position;

Third, to provide a novelly constructed prism supporting block for supporting the prism in various positions for grinding and polishing;

Fourth, to provide a novelly constructed supporting means for the prism supporting block whereby distortion of prism position is reduced to a minimum;

Fifth, to provide a novel means for supporting the prism supporting block while grinding the various corners and other ground portion of the prism;

Sixth, to provide a means of producing binocular prisms of this class which is very simple and economical of construction, easy to operate, efficient in its action and which will not readily deteriorate or get out of order.

Seventh, to provide a novel method of producing binocular prisms; and

Eighth, to provide a novel method of supporting binocular prisms for grinding and polishing the various surfaces thereof.

Figure 1:
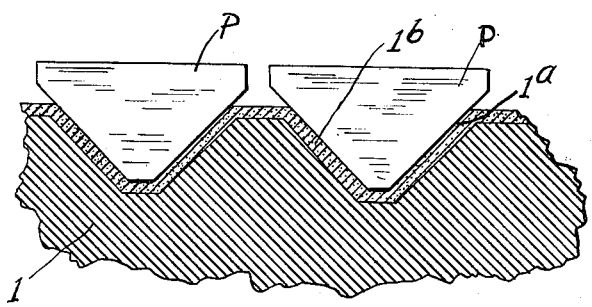
Figure 14:
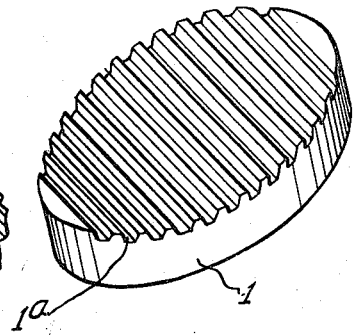
Figure 2:
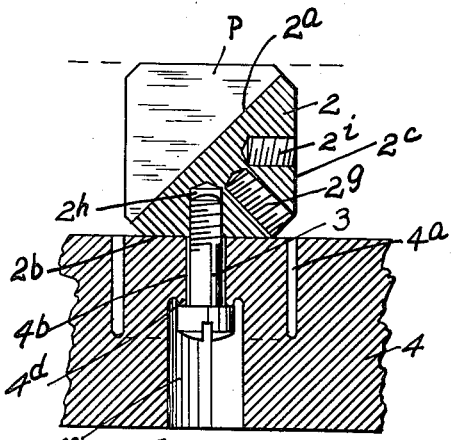
Figure 3:
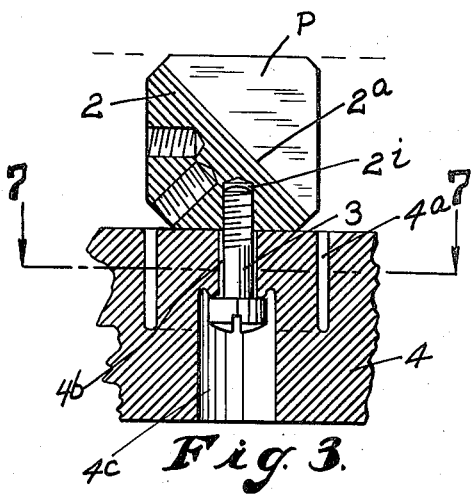
Figure 4:
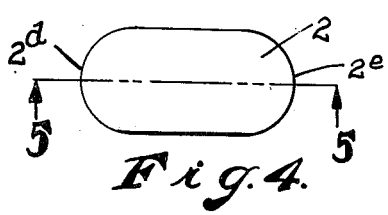
Figure 7:
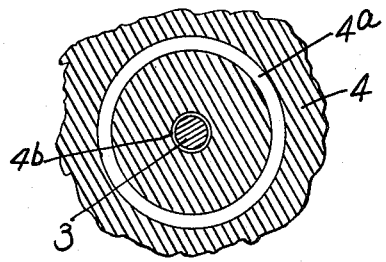
Figure 5:
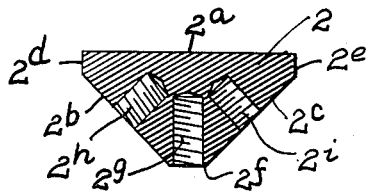
Figure 6:
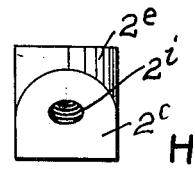
Figure 8:
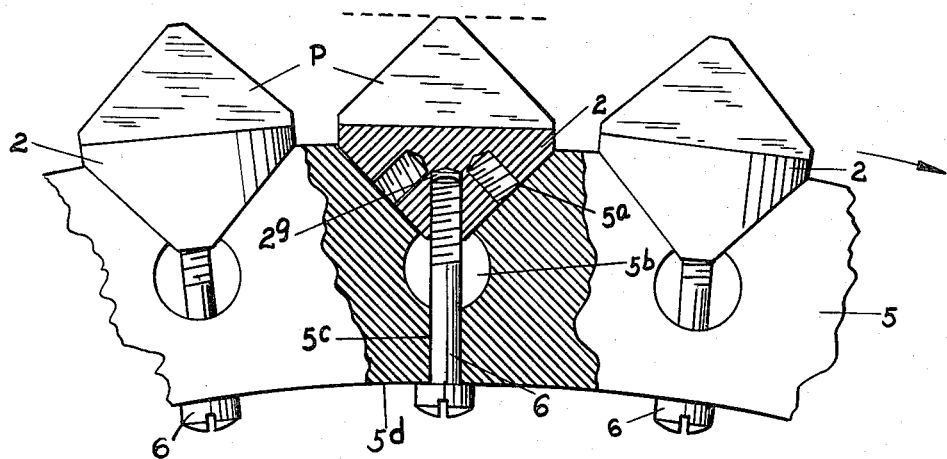
Figure 9:
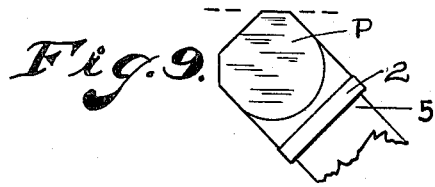
Figure 10:
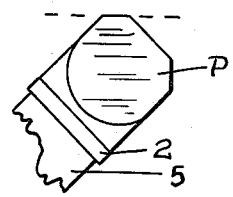
Figure 11:
Figure 12:
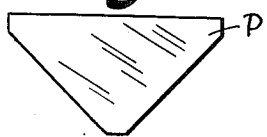
Figure 13:

With these and other objects in view as will appear hereinafter, my invention consists of certain novel features of construction, combination and arrangement of parts and portions and the certain novel method of preparing and producing binocular prisms as will be hereinafter described in detail and particularly set forth in the appended claims, reference being had to the accompanying drawings and to the characters of reference thereon which form a part of this application in which:

Figure 1 is a fragmentary sectional view of a die member showing two of the prisms in the rough positioned therein ready to be ground and polished on its diagonal or long side; Fig. 2 is a fragmentary sectional view showing a portion of the block supporting plate with the block secured thereto in one position and with the prism secured thereto; Fig. 3 is a similar view showing the block and prism in reversed position for grinding and polishing another side; Fig. 4 is a plan view of the prism supporting block; Fig. 5 is a sectional view taken from the line 5—5 of Fig. 4; Fig. 6 is an end view of the prism supporting block; Fig. 7 is a sectional view taken from the line 7—7 of Fig. 3; Fig. 8 is a fragmentary side elevational view of the annular block supporting member with the block and prism secured in its proper relation therewith and a portion broken away and in section to facilitate the illustration; Fig. 9 is a diagrammatic view of the annular block supporting member 5, in position for grinding the corners of the prism on one side showing the block and prism thereon; Fig. 10 is a similar view showing the same positioned for grinding the opposite corners; Fig. 11 is a plan view of the finished prism; Fig. 12 a side elevational view thereof; Fig. 13 an end view thereof, and Fig. 14 is a perspective view of the die member shown in Fig. 1.

Similar characters of reference refer to similar parts and portions throughout the several views of the drawings:

The die member 1, prism supporting blocks 2, bolts 3, block supporting plate 4, annular block supporting member 5, and bolts 6 constitute the principal parts and portions of my means for producing binocular prisms and the structure and equipment used in my method of producing binocular prisms.

The die member 1 is preferably a plate which may be cast if desired, preferably flat on its upper and lower surfaces. It is provided in its upper surface with V-shaped grooves 1a in close relation to each other so that they substantially fill the entire upper surface of said die member and are arranged to receive the rough glass prism positioned with the diagonal or long side up and secured in these grooves by means of pitch or similar material 1b, as shown in Fig. 1 of the drawings. Thus the upper surfaces of all of the prisms in the die member 1 are on the same plane and any grinding member or polishing member may be used on these upper surfaces of the prism P and ground so that they are all of the same level. Then they are all polished. This means and method is conventional so far except the diagonal or long sides are not polished immediately after they are ground, but are polished in a later step. After the polishing operation the die member with the polished surfaced prisms are subjected to heat until the prisms are easily removed from the recesses in which they are imbedded. Then the diagonal or long polished sides are secured to the flat sides 2a of the prism supporting block 2 by means of synthetic balsam where it is left until the prism is finished. These prism supporting blocks 2 are each provided with short flat sides 2b and 2c and with rounded ends 2d and 2e thus providing a long diagonal side which is oblong in shape substantially the same size and shape as the diagonal or long side of the prism P which is secured thereto. It is also provided with an opposed short flat side 2f. Positioned centrally in this short flat side 2f is a threaded hole 2g whose axis is at right angles to the side 2a of the member 2. It is also provided in the side 2b with a similar threaded hole 2h which is at right angles to the side 2b and with another similarly threaded hole 2i extending inwardly at right angles from the side 2c, all as shown best in Fig. 5 of the drawings. These threaded holes 2g, 2h and 2i are arranged to receive the threaded ends of the bolts 3 in varying positions as shown in Figs. 2 and 3 of the drawings, it being here noted that in Fig. 2 the bolt is positioned in the hole 2h while in Fig. 3 it is positioned in the hole 2i.

In order to prevent distortion of the block supporting plate 4 where the block 2 is secured thereto, the plate 4 is provided with annular grooves 4a which extends some distance in the upper side of the plate 4, as shown best in Figs. 2, 3 and 7 of the drawings, the plate 4 being preferably made of metal and with parallel upper and lower flat sides. This plate 4 is provided with a large number of these grooves to provide for a large number of the blocks 2 in supported relation.

Centrally of each groove 4a is a bore 4b arranged to receive the bolt 3 and in order to accommodate the head of the bolt 3 there is provided an enlarged bore 4c which extends upwardly in the plate 4 to slightly past the bottom of the groove 4a, all as shown best in Figs. 2 and 3 of the drawings, leaving a shoulder 4d against which the head of the bolt 3 is positioned when the block 2 is secured in position on the block supporting plate 4. This provides for isolating the portion inside the groove 4a and reducing to a minimum the distortion of the supporting portion of the block 2 of the plate 4. By placing the prism supporting block 2 in the position shown in Fig. 2 of the drawings, the short side of the prism may be ground by contact with a flat surface grinder in conventional manner and by shifting the blocks on the plate 4 to the opposite position as shown in Fig. 3 of the drawings, the other short side may be ground in the same manner.

The annular block supporting member 5 is an annular metallic member of substantially the same thickness as the block 2. It is provided with a plurality of substantially V-shaped grooves 5a extending inwardly from its periphery in closely spaced relation to each other, as shown in Fig. 8 of the drawings. These five V-shaped grooves 5a are shaped to conform to the short annular sides of the prism supporting block 2 which is arranged to fit therein as shown in Fig. 8. This annular block supporting member 5 is also provided with bores 5b extending transversely therethrough and intersecting at their outer sides with the V-shaped groove 5a, as shown in Fig. 8 of the drawings. Extending from this bore 5b to the inner side of the annular block supporting member 5 is another bore 5c which is arranged to receive the bolt 6 with the head screwed against the inner surface 5b of the member 5. This bolt is screw threaded and arranged to fit the screw threaded hole 2g in the prism supporting block 2 whereby the block is tightened in position by turning the bolt 6 and held in rigid relation with the annular block supporting member 5 with the prism member P secured thereto with its side walls extending slightly past the side walls of the block 2. With the blocks 2 with the prisms P secured thereto in this annular block supporting member 5 the whole may be placed on a flat surface grinder and ground in conventional manner until the prism is the proper thickness from the middle, after which the annular block supporting member 5 with the block and prisms is reversed and again ground on the opposite side in a similar manner. In order to grind the apex corners of the prisms, the annular member may be revolved in relation with a fixed grinder, shown by dash lines in Fig. 8 of the drawings, and this annular block supporting member with the blocks and prisms may be positioned in angular position with relation to a grinder, as shown in Figs. 9 and 10 and the opposed corners bevelled. Thus it will be noted that all of these operations are performed with the prism secured on its long side to the long side of the block member 2.

The operation of my means for producing binocular prisms and the method of producing the same is substantially as follows: Rough molded glass prisms are first placed in the die 1 and secured therein by use of pitch. The die is then turned upside down with the flat side down and on the flat grinder and ground in conventional manner. The die with the prisms is then placed on a flat surface polisher and the prisms are polished on the long diagonal side, after which the prisms are removed from the die by means of heat and secured with their flat side diagonal or long side against the diagonal or long side of the prism supporting block 2 by means of synthetic balsam or like material where it stays until the prism is finished. Then the blocks with the prism secured thereto are positioned in the V-shaped grooves 5a and the bolt 6 inserted from the opposite side of the annular block supporting member and secured tightly therein by means of the bolts 6. The sides of the prisms are then ground on a flat surface grinder by reversing the annular block supporting member 5 and its two end prisms. Then revolving the block supporting member with the prisms and grinding the apex corners of the prisms off. Then positioning the inner block supporting member in angular position and revolving them against a relatively fixed grinder and grinding the corners, as shown in Figs. 9 and 10. Then the block 2 together with the prism P is removed and the ends ground to substantially conform to the ends of the blocks 2. The blocks with the prism P is then positioned as shown in Fig. 2 on the block supporting plate 4 secured by the bolts 3, the outer surface of the prism is then ground as predetermined. It is then polished. The block 2 is then secured in relation with the block 4, as shown in Fig. 3 and the outer side of the prism is ground and then polished the same as the other short side. The prism then is removed from the block 2 by means of the groove placed in the middle of the long or diagonal side in conventional manner.

Though I have shown and described a particular construction, combination and arrangement of parts and portions for producing binocular prisms and a certain method of producing binocular prisms, I do not wish to be limited to this particular construction, combination and arrangement, nor to the method herein described, but desire to include in the scope of my invention the construction, combination and arrangement and the process substantially as set forth in the appended claims.

Having thus described my invention what I claim as new and desire to secure by Letters Patent is:

1. In a means for producing binocular prisms, a prism supporting block shaped substantially to conform with the prism and provided with threaded bolt receiving holes at right angles to the short angular sides of said block.

2. In a means for producing binocular prisms, a prism supporting block shaped substantially to conform with the prism and provided with threaded bolt receiving holes at right angles to the short angular sides of said block, and means for readily removably securing the diagonal or long side of said prism to the similar side of said block.

3. In a means for producing binocular prisms, a prism supporting block shaped substantially to conform with the prism and provided with threaded bolt receiving holes at right angles to the short angular sides of said block, means for readily removably securing the diagonal or long side of said prism to the similar side of said block, and a block supporting plate provided with a flat surface, said plate provided with a weakened portion surrounding the block positioned thereon.

4. In a means for producing binocular prisms, a prism supporting block shaped substantially to conform with the prism and provided with threaded bolt receiving holes at right angles to the short angular sides of said block, means for readily removably securing the diagonal or long side of said prism to the similar side of said block, a block supporting plate provided with a flat surface, said plate provided with a weakened portion surrounding the block positioned thereon, and a bolt threaded to fit the threads in the extended holes of said block and mounted in said plate.

5. In a means for producing binocular prisms, a prism supporting block shaped substantially to conform with the prism and provided with threaded bolt receiving holes at right angles to the short angular sides of said block, means for readily removably securing the diagonal or long side of said prism to the similar side of said block, a block supporting plate provided with a flat surface, said plate provided with a weakened portion surrounding the block positioned thereon, and a bolt threaded to fit the threads in the extended holes of said block and mounted in said plate with its head substantially in alignment with the bottom of the grooves in said plate.

6. In a means for producing binocular prisms, a prism supporting block shaped substantially to conform with the prism and provided with threaded bolt receiving holes at right angles to the short angular sides of said block, said block also provided with another similar threaded hole positioned in the apex of said block at a right angle to the long or diagonal side of said block.

7. In a means for producing binocular prisms, a prism supporting block shaped substantially to conform with the prism and provided with threaded bolt receiving holes at right angles to the short angular sides of said block, said block also provided with another similar threaded hole positioned in the apex of said block at a right angle to the long or diagonal side of said block, an annular block supporting member provided with a plurality of angular grooves in the periphery of said block and extending inwardly.

8. The herein described method of supporting binocular prisms for finishing the same consisting in supporting the prism in a die, then grinding the long surface of said prism, then polishing the long surface of said prism, then securing said polished surface of said prism to the long side of a block shaped similarly to said prism by the use of synthetic balsam, whereby said prism is supported by said block for finishing the remaining surfaces thereof.

9. The herein described method of supporting binocular prisms for finishing the same consisting in supporting the prism in a die, then grinding the long surface of said prism, then polishing the long surface of said prism, then securing said polished surface of said prism to the long side of a block shaped similarly to said prism by the use of synthetic balsam, whereby said prism is supported by said block for finishing the remaining surfaces thereof, then supporting said block with said prism in varying positions for finishing the other surfaces thereof.

10. The herein described method of supporting binocular prisms for finishing the same consisting in supporting the prism in a die, then grinding the long surface of said prism, then polishing the long surface of said prism, then securing said polished surface of said prism to the long side of a block shaped similarly to said prism by the use of synthetic balsam, whereby said prism is supported by said block for finishing the remaining surfaces thereof, and then yieldably supporting said block together with said prism in varying position for finishing the other surfaces of said prism.

11. The herein described method of supporting binocular prisms for finishing the same consisting in first grinding, then polishing the diagonal surface of the rough prism, then securing the polished surface side to the similar side of a supporting block substantially the same shape and form.

12. The herein described method of supporting binocular prisms for finishing the same consisting in first grinding, then polishing the diagonal surface of the rough prism, then securing the polished surface side to the similar side of a supporting block substantially the same shape and form, then supporting said blocks in varying positions for finishing the remaining surfaces of said prism.

13. In a means for producing binocular prisms, a prism supporting block shaped substantially to conform with the prism and provided with threaded bolt receiving holes at right angles to the short angular sides of said block, said block also provided with another similar threaded hole positioned in the apex of said block at a right angle to the long or diagonal side of said block, an annular block supporting member with V-shaped grooves in its surface and a bolt extending from the inner side of said supporting member with its threaded end in said hole in the apex of said block.

14. In a means for producing binocular prisms, a prism supporting block shaped substantially to conform with the prism and provided with threaded bolt receiving holes at right angles to the short angular sides of said block, said block also provided with another similar threaded hole positioned in the apex of said block at a right angle to the long or diagonal side of said block, an annular block supporting member with V-shaped grooves in its surface and a bolt extending from the inner side of said supporting member with its threaded end in said hole in the apex of said block, said supporting member provided with a bore intermediate the sides thereof and intersecting the V-shaped groove therein through which said bolt passes.

15. In a means for producing binocular prisms, a prism supporting block shaped substantially to conform with the prism and provided with threaded bolt receiving holes at right angles to the short angular sides of said block, said block also provided with another similar threaded hole positioned in the apex of said block at a right angle to the long or diagonal side of said block, an annular block supporting member with V-shaped grooves in its surface and a bolt extending from the inner side of said supporting member with its threaded end in said hole in the apex of said block, said supporting member provided with a bore intermediate the sides thereof and intersecting the V-shaped groove therein through which said bolt passes, said annular block supporting member being of a thickness substantially the thickness of said block.

16. In a means for producing binocular prisms, a prism supporting block shaped substantially to conform with the prism and provided with threaded bolt receiving holes at right angles to the short angular sides of said block, said block also provided with another similar threaded hole positioned in the apex of said block at a right angle to the long or diagonal side of said block, and a block support for said block provided with a bolt receiving hole arranged to align with one of the holes in said block.

HENRY S. TENNY.